UNITED STATES PATENT OFFICE.

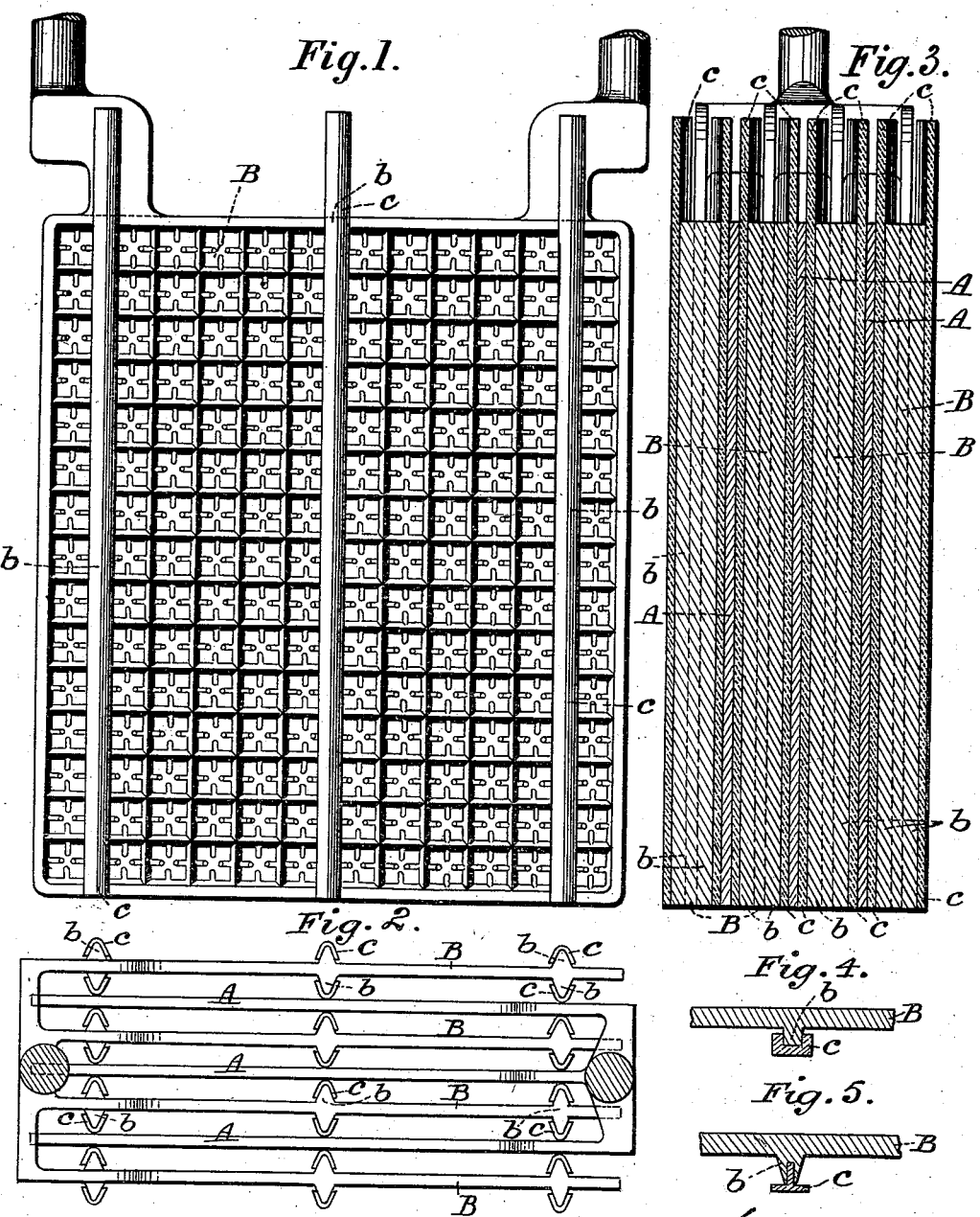

FRANK KING, OF LONDON, ENGLAND.

SECONDARY BATTERY.

SPECIFICATION forming part of Letters Patent No. 501,723, dated July 18, 1893.

Application filed March 16, 1893. Serial No. 466,342. (No model.)

*To all whom it may concern:*

Be it known that I, FRANK KING, electrical engineer, a subject of the Queen of Great Britain and Ireland, residing at 4 Great Winchester Street, in the city of London, England, have invented certain Improvements in Secondary Batteries, of which the following is a specification.

My invention relates to improved means by which the plates of opposite denomination in a secondary battery are separated and insulated from each other otherwise than through the electrolyte.

According to my invention I provide the plates (preferably the pure or spongy lead plates or plates of like denomination) with ribs or with lines or rows of pins or the like projecting from the surface of the plate a distance slightly less than the distance apart at which the plates are to be maintained. At the outermost face, or edge of each of the said projecting ribs, or of each of the lines, or rows, of pins or the like I place a piece or strip of insulating and acid resisting substance which is held in position against the opposing plate or plates by the said ribs, or pins or the like and is preferably so shaped as to deflect away from the rib, pin or the like any material resulting from the exfoliation of the surface of the opposing plate or plates or any particles of material which may fall out of the said plate or plates.

I will describe with reference to the accompanying drawings what I consider the best way of carrying out my invention, but I do not limit myself to the precise details shown.

The accompanying drawings represent some plates of a battery to which my invention is applied. It is to be understood that the invention is not limited to the form of plate shown.

Figure 1 is a side view; Fig. 2 a plan and Fig. 3 a section in a plane at right angles to Fig. 1. Figs. 4 and 5 represent modified forms of the ribs.

A are the plates of one denomination and B are those of the other denomination. These latter are formed with ribs $b$ on each side extending vertically along the plate and most conveniently cast with it. Upon each of the ribs $b$ a channeled or trough shaped strip $c$ of ebonite, or other insulating, and acid resisting, material, is placed which strips bear against the adjacent plate, or plates. The strips, and the ribs upon which they are placed, are shown as being somewhat of a wedge-shape to deflect away any material which may fall, or exfoliate, from the opposed plate. The ribs $b$ may be in any convenient number, and they may be continuous, or non-continuous, or they may be substituted by rows of projections, or pins, upon which the strips $c$, are placed. In place of the strips $c$, and ribs $b$, being of the wedge shape shown they may be of other shape for instance they may be shaped as shown in Fig. 4, or they may be of the shape shown in Fig. 5 and be held in grooves, or openings, in the ribs $b$, or the substitutes therefor, but, in all cases, the strips $c$, are to be continuous, and they should be placed vertically, or approximately so.

Although I have shown ribs $b$, on two sides of alternate plates, there may be ribs only on one side of each plate.

Having now particularly described and ascertained the nature of my said invention and in what manner the same is to be performed, I declare that what I claim is—

A plate for secondary batteries having projections extending out from the surface thereof, and combined with continuous strips of insulating and acid resisting material placed over said projections, substantially as described.

In testimony whereof I have signed my name to this specification in the presence of two subscribing witnesses.

FRANK KING.

Witnesses:
 RUDOLPH CHAS. NICKOL,
 S. CRANSAR,
*Both of 31 Lombard Street, London, E. C.*